United States Patent [19]
Ahlen

[11] 3,844,120
[45] Oct. 29, 1974

[54] QUOTIENT REGULATOR FOR CONTROLLING HYDRODYNAMIC TRANSMISSION

[75] Inventor: Karl Gustav Ahlen, Stockholm, Sweden

[73] Assignee: S.R.M. Hydromekanik Aktiebolag, Stockholm-Vallingby, Sweden

[22] Filed: June 6, 1973

[21] Appl. No.: 367,378

[52] U.S. Cl.................... 60/341, 60/343, 60/347, 60/361
[51] Int. Cl............................................. F16d 33/00
[58] Field of Search ............ 60/330, 333, 341, 343, 60/345, 347, 361

[56] References Cited
UNITED STATES PATENTS
2,603,943  7/1952  Evernden .............................. 60/333
3,022,631  2/1962  De Corte et al. ..................... 60/343

*Primary Examiner*—Edgar W. Geoghegan
*Attorney, Agent, or Firm*—Larson, Taylor and Hinds

[57] ABSTRACT

A control system for effecting shifts of a transmission such as a hydrodynamic transmission. A first pump driven by the primary side of the transmission delivers fluid via a connecting pipe to the inlet of a second pump driven by the secondary side of the transmission. The pressure in the connecting pipe, which varies in relation to the speed ratio or "quotient" of the primary side to the secondary side, is sensed and used to transmit a signal for effecting a shift of the mode of operation of the transmission.

25 Claims, 4 Drawing Figures

QUOTIENT REGULATOR FOR CONTROLLING HYDRODYNAMIC TRANSMISSION

BACKGROUND OF THE INVENTION

This invention relates to the automatic and remote control of hydrodynamic transmissions. The invention may be used to control the operation of various types of such transmissions such as torque converters including a so-called direct drive lock-up clutch, those having a gear arrangement for utilizing the guide vane as a turbine in one stage and those which further include a reverse gear and/or a multiple speed mechanical gear.

The simplist way of controlling the direct lock-up clutch connection is with a centrifugal regulator possibly combined with different known means to effect the shift point. However, this system is unable to fully utilize the benefits of direct drive in that either the fuel consumption will be high because direct drive is not utilized in partial load at lower speeds, or the acceleration will be poor due to locking-up taking place prematurely. If the centrifugal regulator is itself controlled by, for example, the throttle position, either directly or indirectly, a slight improvement is obtained.

The first theoretically correct system for automatic connection or disconnection of direct drive was described in my U.S. Pat. No. 2,707,408. This system was based on a mechanism called a ratio regulator, which was the subject of British Pat. No. 678,575. By means of this regulator it was for the first time made possible to obtain a shift impulse which depended on the speed ratio between the primary and secondary shafts of a torque converter, that is, the theoretically correct shift point. Further, the regulator, when direct drive was connected, did not disconnect, because the ratio was then fixed.

A combination of such regulators made it possible to utilize the direct drive in the best possible way as described in the above mentioned U.S. Patent for automatic connection or disconnection of direct drive. The same regulator was also used as the basis for shifts between double rotation and single rotation which theoretically, has one perfect gear ratio shift point. Transmissions with the last mentioned automatic control system have been manufactured in large numbers and have made significant contributions in the development of the control of hydrodynamic transmissions and particularly transmissions possessing double and single rotation facilities according to my U.S. Pat. No. 3,005,359.

However, the system described above has the disadvantage that is is complicated and requires torque converters which could drive the same unit of the control device, that is, the autopilot, from both the primary and the secondary sides of the torque converter.

Further, it has been found that manufacture of blade systems in many different places and indeed even from the same drawings has resulted in the production of torque converters with different shift points. Also changing the specific torque absorption (Ms) of different systems has resulted in changes in requirements of the ratio regulator shift points.

Thus, there exists a need for a new and improved arrangement for controlling shifts in such transmissions.

SUMMARY OF THE INVENTION

According to the present invention there is provided a ratio, or "quotient" regulator suitable for use in the control of transmissions such as hydrodynamic transmissions, the regulator having for each shift function a first pump, for example, a small gear pump, driven by the primary side of the transmission and a second similar pump driven by the secondary side of the transmission, the first gear pump being preferably supplied with fluid from the transmission feeder fluid pump system and operable to direct a quantity of fluid into a pipe connecting the two pumps, whereas the second mentioned pump is operable to discharge fluid from the said pipe. If a certain speed ratio is required, the capacities of the pumps are made to be equal at that speed ratio, which means that at about that speed ratio, there is no pressure in the connecting pipe, because it is emptied as fast as it is filled. On the other hand, below that speed ratio, some of the oil fed into the pipe has to be released through a maximum pressure valve. Because the only connection between the two pumps is a pipe line, it is now possible to mount the pump driven from the secondary side on, for instance, the outside of the transmission.

BRIEF DESCRIPTION OF THE DRAWINGS

The invention will now be described more in detail by way of example with reference to the accompanying drawings in which.

DETAILED DESCRIPTION OF THE PREFERRED EMBODIMENTS

Figure 1:
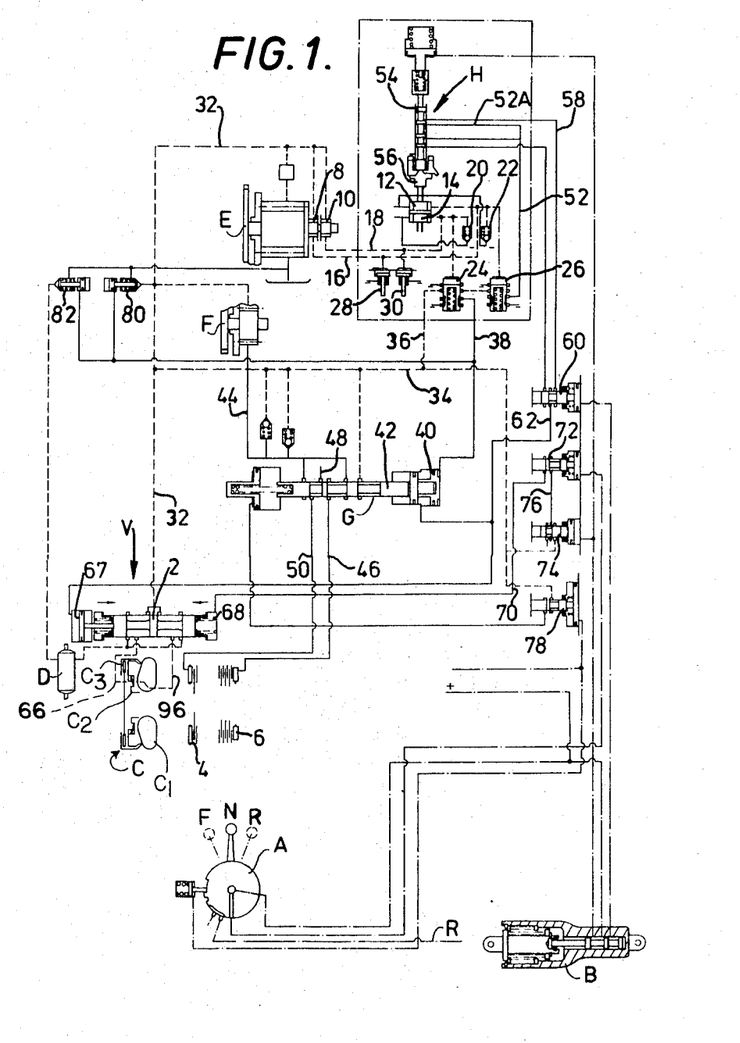
FIG. 1 shows diagramatically the control system for both the direct drive connection and the direct drive disconnection under different circumstances and the shift of the guide vanes between double and single rotation in a so-called DS converter having a releasable pump part or a releasable turbine part as shown in my U.S. Pat. applications Ser. Nos. 262,514, filed June 14, 1972 and 348,191, filed Apr. 6, 1973, respectively, although the system is applicable to any torque converter system having a direct drive and/or a double rotation arrangement.

Referring to FIG. 1, A is a driver's control valve for selecting forward (F), neutral (N) and reverse (R). A throttle valve B indicates, if the throttle is released, or if the throttle is depressed into its maximum position. A torque converter is schematically indicated at C having a torque converter working chamber $C_1$, a releasable pump $C_2$, a lock-up clutch $C_3$ and two brakes 4 and 6. The brake 4 serves to hold the reaction or guide part of the torque converter stationary and the brake 6 serves to hold a planet gear located between the reaction member and the turbine in a first speed range. This arrangement allows simultaneous connection of direct drive and stalling of the planet gear for hydraulic braking. The circuit of FIG. 1 has a valve V with a valve rod 2 distributing oil from a feeder fluid pump E either to connect direct drive or to connect hydraulic drive of the torque converter C. D is a heat exchanger. A high pressure pump F cooperating with the feeder fluid pump E supplies high pressure oil for the brakes. Further, a main valve G controls the supply of pressure oil from pump F to one or the other of the brakes 4 or 6 of the torque converter C or may be operated to release the pressure. An arrangement H has a centrifugal regulator driven from the output shaft of the torque converter C and has two associated small gear pumps 12 and 14. The feeder fluid pump E also has two associated small gear pumps, 8 and 10. The gear pumps 8 and 10 are fed from the pressure side of the feeder fluid pump E and are connected to the pumps 12 and 14 respectively by pipes 16 and 18. From the pipes 16 and 18 there are maximum pressure valves 20 and 22. Also connected into these pipes are servo-valves 24 and 26 and further, to the two pipes are connected release valves 28 and 30 which, at low fluid quantities, discharge the pipes 16 and 18, but at the passage of larger quantities of fluid they close and these valves produce a hysteresis function.

Figure 4:
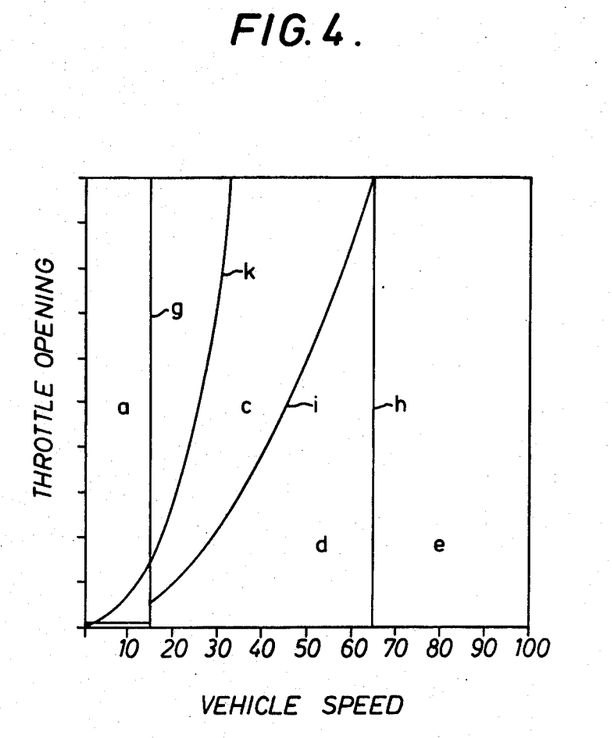
FIG. 4 is a diagram showing the relationship between the throttle opening (which is also a measure of the fuel injection) and the vehicle speed wherein the lines thereon show the limits of the different fields of drive.

In operation, when the vehicle is started, the turbine shaft is standing still and consequently the pumps 12 and 14 do not operate. As soon as the engine is running, the feeder fluid connected pumps 8 and 10 feed fluid into pipes 16 and 18, and pressure is built up in pumps 12 and 14 to the extent permitted by release through the maximum pressure valves 20 and 22 inasmuch as the pressure does not leak through the release valves 28 and 30. The existence of pressure in the pipes 16 and 18 means that the servo-valves 24 and 26 take positions compressing their positioning springs. When the vehicle accelerates the secondary shaft increases in speed and the pumps 12 and 14 are driven faster and faster. At a certain speed corresponding to a speed ratio of about 0.22 the capacity of the pump 14 becomes sufficiently large to release the pressure from the pipe 18, whereby the servo-valve 24 is moved back by its positioning spring to permit oil from the feeder fluid pump E to flow through the pipes 32, 34 and 36 to now enter the pipe 38 to convey fluid to a first servo-motor 40 of the valve arrangement G. This displaces the valve rod 42 of the valve G to the left in such a way that it cuts-off the supply of pressure fluid from the pump F through the pipe 44 to the pipe 46 feeding the servo-motor of the brake 6, and instead it connects the pipe 46 to the vent 48. The brake 6 is therefore released and the valve rod 42 connects the pipe 44 instead to a pipe 50 which conveys fluid to the servo-motor of the brake 4, stalling the reaction or guide vane. By this procedure, a shift from double rotation to single rotation of the torque converter in question is obtained. When the pressure in the line 18 falls below a predetermined value the release valve 30 is returned to its open position which assures that a return to the first condition, namely, brake 6 on and brake 4 released, cannot occur before the capacities of the pumps 8 and 12 have been reduced to the said predetermined value until the speed ratio of 0.22 is reached. As the vehicle continues to accelerate, these conditions are reached whereupon direct drive should, preferably, be connected. This will take place when the tractive effort in direct drive is the same as the tractive effort obtainable in hydraulic drive or slightly earlier. At this speed of the secondary shaft the pump 12 empties the pipe 16, since it has reached a higher capacity than the pump 8 and, thereby, the servo-valve 26 is returned to its rest position by its positioning spring whereupon valve 26 opens a connection to pipes 52 and 52A. Oil is thus conveyed to a valve 54 whose position depends on a two-stage centrifugal regulator 56, which serves to ensure that the connection of direct drive does not take place below a certain speed of the vehicle corresponding to the lowest allowable drive speed in direct drive, as shown in FIG. 4, line g.

If, in this situation, the first step of this centrifugal regulator 56 is opened, the valve 54 will be in a position to convey fluid to a pipe 58 via another valve 60 which is influenced by the throttle valve B. If this valve 60 (which has the function of cutting off the fluid pressure in pipe 58), is not moved into the position for so-called kick-down, it conveys fluid to a pipe 62, which influences a servo-motor 67 of the valve 2 and moves this to the right into the position to cause direct drive. This is achieved by conveying pressure fluid from the line 32 via valve 2 to the line 66, whereupon the fluid moves the pump part $C_2$ in the direction towards the direct drive clutch, working as a servo-motor. Before this condition was reached, a smaller servo-motor 68 caused the same fluid to be delivered via line 96 to the opposite side of the pump part $C_2$ to connect the pump to the rotating casing of the torque converter C for hydraulic drive. The pressure fluid for the servo-motor 68 arrived through a pipe 70 from the feeder fluid line 34 via valves 72 and 74 which valves are connected by a pipe 76. The valve 74 in the second position of the throttle valve B does not receive air pressure and thus allows the feeder fluid oil to enter the pipe 76 when the valve 72 has received air pressure from the driver's control valve A thereby indicating a readiness to drive and hence let pressure through 76 to 70.

The servo-system of FIG. 1 also includes a valve 78 and pipe connections for connecting hydraulic braking. However, this is not essential for the presentation of the invention and is not, therefore, described in detail.

The maximum pressure valves 80 and 82 are parts of the normal torque converter system and determine different levels of pressure in the blade system and a detailed description thereof is not essential for understanding the present invention. For similar reasons the blocking device for forward-neutral-reverse and the connection for forward-neutral-reverse are not described in detail.

Figure 2:
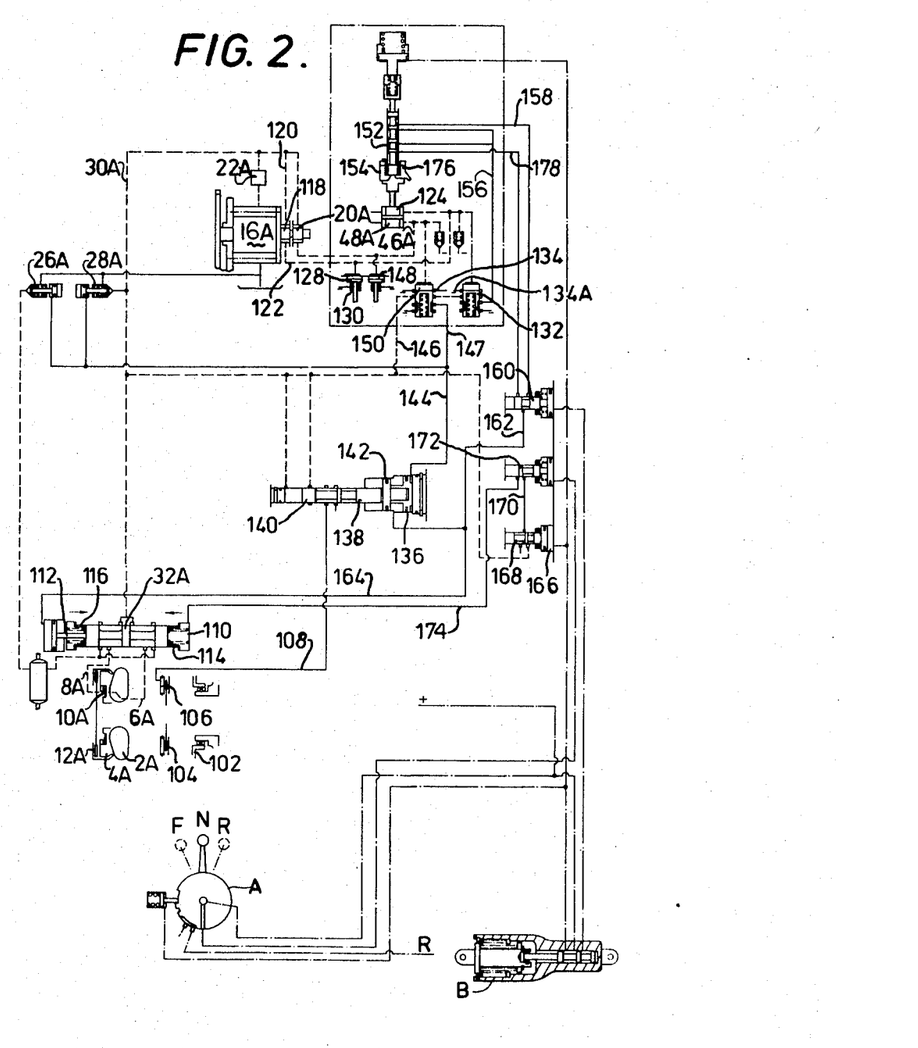
FIG. 2 shows diagramatically a modification of FIG. 1, in that a freewheel guide vane is utilized instead of a brake in the torque converter and, the system, therefore, simplified.

The control system of FIG. 2 is applicable for a torque converter of basically the same type as FIG. 1, but modified in that the reaction or guide vane is arranged for use as a turbine in the low speed range. In this special case the reaction torque in the low speed range is transmitted over a free-wheel, and the guide is kept stationary by a brake in the medium range. Except for the automatic control of the direct drive lock-up function, FIG. 2 also shows an automatic system for controlling both double and single rotations.

In FIG. 2, the working chamber 2A of a torque converter and the space 4A includes an element for connecting either hydraulic drive or direct drive or when released to effect neutral. A friction plate 12A serves to connect direct drive, and a maximum pressure valve 10A determines the pressure drop at which oil shall pass through the space 4A between a pipe 8A and a pipe 6A. Instead of the normal free-wheel for the guide vane of the torque converter, the guide vane may operate over a planet gear held from rotating backwards by a free-wheel 102. At the same time the planet gear reverses the direction of rotation and delivers the guide vane torque to the turbine or alternatively, the guide vane may be kept stationary by a brake 104, under the control of a servo-motor 106 which is activated through the pipe 108. A valve 32A having three positions effects actuation of hydraulic drive, neutral or direct drive due to pressures in servo-cylinders 110 or 112. The valve 32A is kept in its middle position by the springs 114 and 116 when these cylinders 110 and 112 are not pressurized. The torque converter has a feeder fluid pump 16A driven from the primary side of the torque converter, the fluid from which passes through a filter 22A and feeds the valve 32A through the pipe 30A. The pumps which are part of the quotient regulator for controlling the direct drive are designated 20A and 48A. The throttle valve B and the driver's control valve A are the same as in FIG. 1. The control system according to FIG. 2 is especially suitable for use as a railcar transmission, where simplicity is of utmost importance and where small steps in tractive effort are not felt.

The same system could equally well be used on a normal double rotation, single rotation transmission having a free-wheeled planetary gear in the direct drive but without a releasable pump. Because the function of the shift for double and single rotations is different from the system of FIG. 1, this will be described first.

The pump 118 receives pressure fluid through the pipe 120 from the feeder fluid pump 16A. A certain quantity of this fluid (depending on the speed of the pump, that is, the speed of the primary member of the torque converter), is delivered through the pipe 122 to the pump 124 which is driven from the output shaft of the torque converter 2A. The sizes of the pumps are so selected that at the speed ratio between the pumps corresponding to the speed ratio between the primary and the secondary shafts of the transmission and at which shift from double to single rotation is desired, the pressure in the pipe 122 is reduced to zero since the pump 124 overtakes the capacity of the pump 118.

To allow a displacement of the shift point to a lower speed ratio, the pipe 122 is connected to a valve 128 at the moment when the pressure drops in the pipe 122 whereupon the spring 130 of the valve 128 moves the movable element of the valve to a position allowing fluid to pass through the valve 128 to exhaust. Thereafter, the pump 124 can reduce its speed below the previous balance speed to a degree determined by the exhaust opening of the valve 128, before the valve 128 due to the pressure drop through a bleed around the valve again closes re-setting the conditions with high pressure in the pipe 122. The pipe 122 is also connected to a valve 132, which when the pipe 122 is pressurized vents surplus fluid through a vent 134A to a servo-cylinder 136 effecting the position of a valve 138, which is kept in its left hand position by a fluid piston 140 using the basic pressure. This valve also has a second servo-motor 142 which does not effect direct drive but, at direct drive releases the guide vane brake 104. The valve 138 controls connection or disconnection of the brake 104 for double rotation, single rotation or direct drive. When the servo-cylinder 136 receives pressure through the pipe 144, (which was vented through the valve 132, when there was pressure in the pipe 122, but which, when there is no pressure in the pipe 122, connects a basic pressure line 146 with the pipe 144) then the valve moves over into a position giving pressure to the servo-motor 106, closing the brake 104. Pressure in the line 122 then means single rotation, except when piston 142 is not pressureized for direct drive, when the brake servo-motor 106 is again exhausted. By this arrangement the shift between double and single rotations is achieved.

Figure 3:
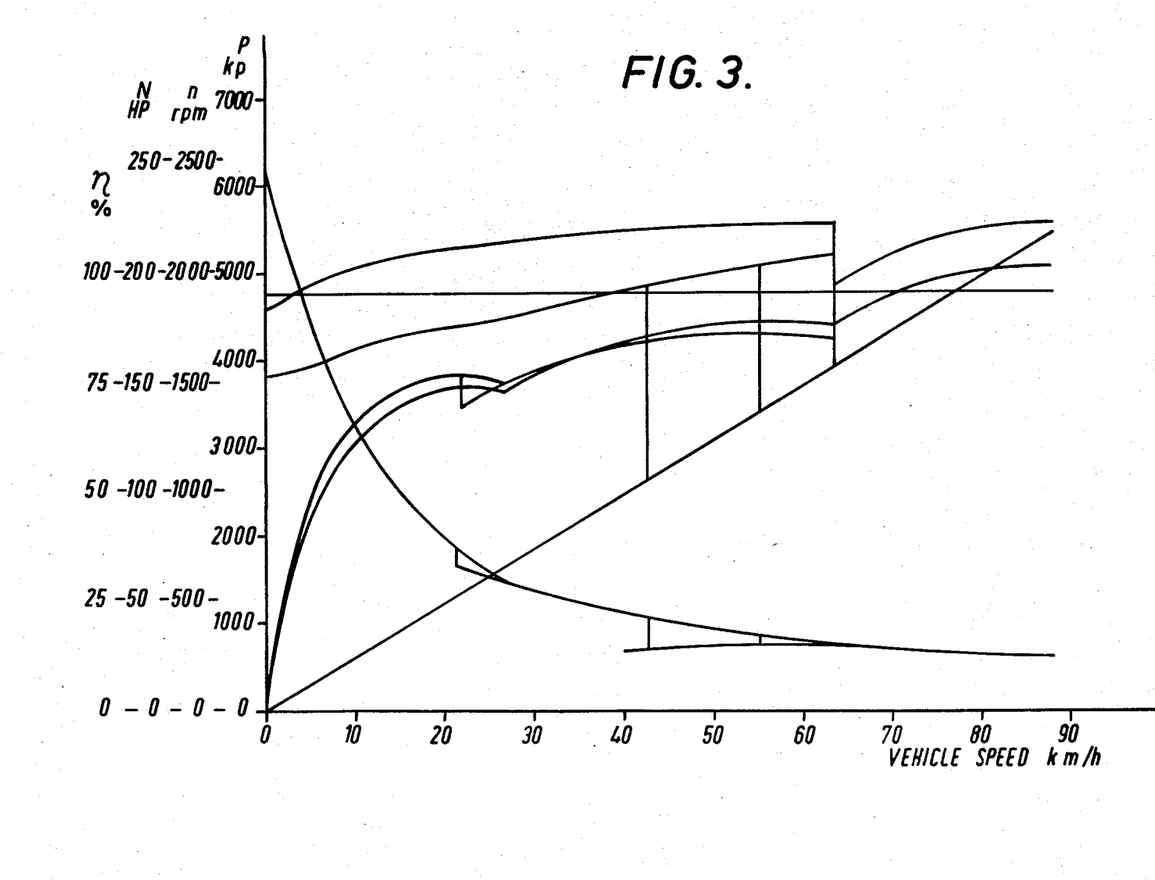
FIG. 3 is a performance diagram of the torque converter to which the control system of the invention is applied.

FIG. 3 shows a performance diagram of a torque converter of the type in question at full throttle and with the primary speed, $n1$, secondary speed $n2$, tractive effort P, and mechanical efficiency, $n$, and it shows that the shift point (i.e., $n/n_1=1$) has been displaced to be obtained before the efficiency in double and single rotations becomes equal. This is to compensate for the possible influence of viscosity and volume efficiencies of the element in the quotient regulator and the variation in pressure needed by different viscosities to ensure that shifts never take place on the upper side of the crossing point between the efficiency lines.

To allow this, however, it is necessary that, when a shift from double to single rotation has taken place, the transmission stays in single rotation, even if immediately after the shift there should be a retardation. This is obtained by the valve 128, which allows the pump 124 to retard by a certain percentage of its speed during which the higher capacity of the pump 118 oil is exhausted through the valve 128, whereas at a certain flow therethrough this valve closes and effects a regaining of the double rotation drive by releasing the brake 104. The element 128 can be made in different ways, one way is to use a springs with a negative characteristic, which, then depends only on the pressure, or the element shown, which depends on the flow through the valve to decide the closing point. The essential aspect is (as with the system of FIG. 1) that a hysteresis is established for the quotient regulator. The pressure in the pipe 144 is also used to reduce the pressure difference through the maximum pressure valve and in the return line from the hydraulic system in single rotation and direct drive, where high pressure is not necessary. Strictly speaking, however, this system is not part of the remote control.

For direct drive control, the two pumps 20A and 48A work in the same way as their counterparts 10 and 14 in FIG. 1 giving pressure to or venting the connecting line 46A between the pumps. In the present embodiment, however, valves 128, 148, 132, 150 are used, the valve 150 functioning as a servo-valve to utilize the basic fluid pressure to ensure that direct drive is not connected before the speed of the pump 48A exhausts the pressure from the pipe 46A.

When, however, there is no pressure in the pipe 46A and then also no pressure in pipe 122, the basic fluid reaches the valve 152, and depending on the position of the centrifugal regulator 154 and the position of the throttle valve B, it will then establish the connection of direct drive. The condition is that the first low speed centrifugal regulator should have moved the centrifugal regulator from its first position to its second position allowing connection of the pipes 156 and 158 to convey fluid to the neutral valve 160, which under the condition of neutral in the throttle linkage valve 170 lets the fluid pass to cause direct drive. When direct drive is established, the speed relationships of the pumps are fixed, and the direct drive can only be disconnected by other means. For instance, if only the first step of the centrifugal regulator has moved out, then the pressure on the throttle would change the positions of the throttle valve, which would change the position of the valve 160, which would vent in its turn the direct drive pipe connection 162, 164 to the servocylinder 112. The fluid pressure on the piston in servocylinder 110 moving the valve 32A to the left overrides both the spring 114 and the pressure on the piston, tending to move the piston to the right. If the pressure in the line 164 is released, the valve returns to its position for hydraulic drive under the condition naturally that the remote control valve A is connected in forward or reverse and also that the throttle valve is not in neutral. This means that air pressure is conveyed to the servo-motor 166 of the valve 168, which, when not pressurized, connects the pressure pipe 30A through the pipe 170 to the valve 172, which when not pressurized, connects to the pipe 174 leading to the servo-cylinder 110 moving the valve 32A to the left to the hydraulic position under the condition that the piston 112 is not pressurized simultaneously. If, on the contrary, the speed increases and the second centrifugal regulator step 176 moves the valve 152 to a third postion (in which also the pipe 146 is connected to the pipe 178, at the same time as 146 is connected to 158, and the vent for 178 is closed, while also the vent for 158 is closed), then direct drive is connected independently of the position of the throttle valve. The shift points of the centrifugal regulators are influenced by the position of the throttle valve in such a way that the first step as well as the second step moves out earlier if the throttle is in neutral position than if it is in the position for a throttle opening. Further, if the throttle valve is in kick-down position, this will result in a disconnection of direct drive, if the second regulator is not open.

FIG. 4 shows the relationship between the throttle opening (which is related to the fuel injection) and the vehicle speed and shows the lines limiting the different fields of drive in relation to the control system of FIG. 2.

To the left of the line $k$ in hydraulic drive there is always double rotation due to pressure in the pipe 122 setting the valve 132 in a position to vent the servo-cylinder 136. To the right, however, there will be no pressure in the valve 132. The valve 132 will connect basic pressure to the servo-cylinder 136, which will move the valve 138 into position for single rotation. If, however, direct drive is connected, the valve 138 will move one more step and single rotation will be disconnected in the favor of direct drive.

In the field $a$ the first step of the centrifugal regulator has not moved to its second position and, therefore, only double rotation hydraulic drive can be engaged but if the throttle valve is in neutral, the valve 172 will be in a position disconnecting hydraulic drive leaving the pump in the hydraulic torque converter released. If the first step of the centrifugal regulator has moved out, there will be the possibility either of hydraulic drive, single or double rotation depending on the secondary speed in the field $c$ or direct drive in the field $d$, when the second centrifugal regulator has moved out, which means that one is driving in the field $e$. In the field $e$ direct drive is firmly established, because the throttle valve cannot influence, and the quotient regulator pump pair is locked in a certain speed relation. In the field $d$ or $c$, however, there is a possibility of selecting direct or hydraulic drive. When direct drive is obtained by passing the borderline $i$, the hydraulic drive can only be re-gained either by passing the borderline $g$, when the first regulator goes back to its first position, or by pressing the throttle to kick-down position of the throttle valve, which then releases direct drive. On the other hand running in hydraulic drive, direct drive can always be obtained by reducing the throttle opening to pass the borderline $i$, whereafter, the direct drive can be used up to full throttle. With the system shown in FIG. 2 ideal conditions for remote control of the system with a lock-up clutch is achieved, and, due to the special way the new quotient regulator is arranged, the shifts will take place with accuracy.

Although the invention has been described in considerable detail with respect to preferred embodiments thereof, it will be apparent that the invention is capable of numerous modifications and variations apparent to those skilled in the art without departing from the spirit and scope of the invention.

I claim:

1. A quotient regulator control system for controlling the mode of operation of a transmission comprising:
   a first pump adapted to be driven by the primary side of the transmission,
   a second pump adapted to be driven by the secondary side of the transmission,
   means for supplying fluid to the first pump,
   pipe means for supplying the output of the first pump to the inlet of the second pump, wherein the pressure in the pipe means at any given time is dependent on the relative flow through the two pumps, which relative flow is in turn dependent on the relative speed of the primary and secondary sides of the transmission,
   and a control means responsive to the pressure in said pipe means for transmitting a signal to change the mode of operation of the transmission.

2. A control system according to claim 1, including a source of pressurized fluid, a transmission shifting means operable upon receipt of pressurized fluid thereat for shifting the transmission between different operating modes, said source of pressurized fluid connected to said shifting means via a path which includes a control device, and said control means signal being operatively connected to a control valve to operate the same for controlling the flow of pressurized fluid from the source to the shifting means.

3. A control system according to claim 2, including a further valve in the path between the pressurized fluid source and the shifting means, and a governor means for operating said further valve only at a predetermined speed of the secondary side of the transmission.

4. A control system according to claim 3, wherein the transmission is a torque converter having at least a pump part and a turbine part, said shifting means including means for connecting the torque converter in direct drive in which the primary side is connected directly to the secondary side.

5. A control system according to claim 2, said transmission being a torque converter having a pump part, a turbine part and a guide part, and said shifting means including means for controlling the operation of the guide part.

6. A control system according to claim 5, said shifting means including at least one servo operated friction brake, the servo of which is operable in response to the pressurized fluid from the source.

7. A control system according to claim 6, said shifting means including two servo operated brakes, both connected to the control valve for selectively receiving pressurized fluid from said source, including a first brake for causing the guide part to turn at a first speed, and a second brake for holding the guide part against rotation.

8. A control system according to claim 2, including at least two first pumps adapted to be driven by the primary side, a separate second pump for each first pump, and a separate pipe means interconnecting each first pump and its respective second pump, and said control means being responsive to the pressure in each pipe means wherein the pressure in each pipe means provides a signal, via the control means, for effecting a different shift of the shifting means.

9. A control system according to claim 8, said transmission being a torque converter having a pump part, a guide part and a turbine part, and said shifting means including brake means for changing the operation of the guide part and a direct drive means for connecting the primary side directly to the secondary side.

10. A control system according to claim 9, including a further valve in the path between the pressurized fluid source and the shifting means associated with direct drive, and including a governor means for opening said further valve only at a predetermined speed of the secondary side of the transmission.

11. A control system according to claim 9, said shifting means brake including at least one servo operated friction brake, the servo of which is operable in response to pressurized fluid from said source.

12. A control system according to claim 2, said control means including a first valve operatively connected to the pipe means to close a fluid line when the pressure in the pipe means exceeds a predetermined level, said valve including a spring positioned to open said fluid line when the pressure in the pipe means decreases below said predetermined level, the fluid in said fluid line being operatively connected to the said control valve to open the same to permit fluid to flow from the pressurized fluid source to the shifting means.

13. A control system according to claim 2, including a regulating valve for regulating the pressure in the pipe means to regulate the relative speed between the primary and secondary side at which the signal is transmitted to shift the transmission.

14. A control system according to claim 2, including a restiction in the path between the pipe means and the control valve.

15. A control system according to claim 2, including a pressure difference valve in the pipe means in communication with the inlet of the said second pump for circulating fluid between the oulet of the said second pump and the inlet thereof.

16. A control system according to claim 2, wherein a means for supplying fluid to the first pump includes a feeder pump driven by the primary side, and including servo-valve means for regulating the fluid pressure to the first pump so as to be lower than the pressure of the feeder pump outlet so as to limit the pressure drop between the first and second pumps thereby increasing the volumetric efficiency of said first and second pumps.

17. A control system according to claim 2, said transmission being a torque converter having at least a pump part operatively connectable to a rotating casing of the primary side and a turbine part operatively connectable to the secondary side, at least one of said parts being permanently engaged with its respective side and the other part being releasable from its respective side, and said shifting means including means for connecting or disconnecting the said releasable part.

18. A control system according to claim 17, including means for directly connecting the primary side and the secondary sides together for direct drive, and said shifting means being further operable to connect said direct drive.

19. A control system according to claim 18, said torque converter further including a guide part, and said shifting means further including brake means for changing the speed of the guide part and hence the mode of operation thereof.

20. A torque converter transmission for transmitting torque from a primary side to a secondary side, comprising:
a working chamber having a pump part, a turbine part and a guide part, said torque converter being shiftable between different modes of operation,
a first pump drivingly engaged to be driven by the primary side of the torque converter,
a second pump drivingly engaged to be driven by the secondary side of the torque converter,
means for supplying pressurized fluid to the first pump,
pipe means for supplying the output of the first pump to the inlet of the second pump, wherein the pressure in the pipe means at any given time is dependent on the relative flow through the two pumps, which relative flow is in turn dependent on the relative speed of the primary and secondary sides of the torque converter, and a control means responsive to the pressure in said pipe means for transmitting a signal to shift the torque converter between different modes of operation.

21. A torque converter transmission according to claim 20, including a source of pressurized fluid, a shifting means operable upon receipt of pressurized fluid for shifting the torque converter between different modes of operation, said source of pressurized fluid connected to said shifting means via a path which includes a control valve, and said control means signal being operatively connected to the control valve to operate the same for controlling the flow of pressurized fluid from the source to the shifting means.

22. A torque converter transmission according to claim 21, said shifting means including a direct drive means for connecting the primary and secondary sides together for direct drive, and a brake means for changing the speed of the guide part to vary the mode of operation of the torque converter, said control means including a first valve operable for controlling the flow of pressurized fluid to the direct drive means and a second control valve for controlling the flow of pressurized fluid from the source to the brake means.

23. A torque converter transmission according to claim 22, at least one of the pump part or turbine part being releasable from its primary or secondary side, respectively, and said second control valve also controlling the flow of pressurized fluid from the source to a means for connecting or releasing the releasable part.

24. A torque converter transmission according to claim 21, including at least two first pumps drivingly engaged with the primary side to be driven thereby, a separate second pump for each first pump and a separate pipe means interconnecting each first pump and its respective second pump, said control means being responsive to the pressure in each pipe means wherein the pressure in each pipe means provides a signal, via the control means, for effecting a different shift of the shifting means.

25. A torque converter transmission according to claim 21, including means for preventing the reversal of a given shift, regardless of further pressure changes in the pipe means, until the speed ratio of the primary and secondary sides changes back to the speed ratio which existed prior to said given shift.

* * * * *